US007069474B2

(12) United States Patent
Atallah et al.

(10) Patent No.: US 7,069,474 B2
(45) Date of Patent: Jun. 27, 2006

(54) SYSTEM AND METHOD FOR ASSESSING COMPATIBILITY RISK

(75) Inventors: Dario Atallah, Louisville, CO (US); Clement Ng, Toronto (CA)

(73) Assignee: Sun Microsystems, Inc., Santa Clara, CA (US)

( * ) Notice: Subject to any disclaimer, the term of this patent is extended or adjusted under 35 U.S.C. 154(b) by 682 days.

(21) Appl. No.: 10/246,075

(22) Filed: Sep. 18, 2002

(65) Prior Publication Data

US 2004/0054946 A1 Mar. 18, 2004

(51) Int. Cl.
*G06F 11/00* (2006.01)

(52) U.S. Cl. .............................. 714/39; 714/38; 714/47; 714/49; 714/54; 714/48; 717/142

(58) Field of Classification Search ................. 714/38, 714/39, 47, 48, 54; 717/142
See application file for complete search history.

(56) References Cited

U.S. PATENT DOCUMENTS 5,854,924 A * 12/1998 Rickel et al. ............... 717/132
6,338,141 B1 * 1/2002 Wells ........................... 726/24
6,883,163 B1 * 4/2005 Schwabe ..................... 717/126

* cited by examiner

*Primary Examiner*—Scott Baderman
*Assistant Examiner*—Timothy M. Bonura
(74) *Attorney, Agent, or Firm*—Kent A. Lembke; William J. Kubida; Hogan & Hartson LLP

(57) ABSTRACT

A system and method for assessing binary compatibility between software modules permits software end users to register with a system, download software tools for testing binary compatibility between one or more ABIs and binary files resident on the end users' computer system(s). The testing generates a file including the results of the binary compatibility test for each binary file tested. A unique identifier of each binary file, e.g., the MD5 signature of the binary code, may be uploaded with the results of the compatibility test. The results of the compatibility test and the unique identifier may be further analyzed to determine a risk profile that the binary file(s) on the end user's computer system(s) is not binary compatible with a particular ABI. A report may be generated indicating the binary compatibility risk profile of the files resident on the user's computer system.

21 Claims, 5 Drawing Sheets

SYSTEM AND METHOD FOR ASSESSING COMPATIBILITY RISK

BACKGROUND OF INVENTION

1. Field of the Invention

The present invention relates to computer software, and more particularly to systems and methods for assessing the risk of binary compatibility failure between software products.

2. Background

Modern multi-user/multitasking computer systems run complex operating systems to accomplish concurrent executions of myriad user applications. Broadly speaking, an operating system may be defined as system software that schedules tasks for execution by one or more processing units in a computer system, allocates storage among various application programs, handles the system interface to the peripheral hardware, and presents a default interface to the user when no application program is running. Some examples of operating systems include the UNIX operating system, the IBM OS/2 operating system, the Microsoft Windows family of operating systems and MS-DOS, the Macintosh operating system, the Novell Netware system, the Digital Equipment Corporation's VMS operating system, and the Solaris Unix operating system from Sun Microsystems.

An operating system program may be divided into two parts: (1) the operating system kernel that contains the major operating system functions, such as the scheduler, and (2) various system programs which use facilities provided by the kernel to perform higher-level house-keeping tasks, such as providing an interface to various user application programs. An application program may be defined as a program that performs a specific function directly for the user (perhaps using one or more operating system services via the above mentioned interface). This is in contrast to system software, such as the operating system kernel, which supports the application programs. Word processing and spreadsheet software are common examples of popular application programs.

Operating systems are updated periodically to enhance features, performance, or other parameters. Current versions of application programs may not be compatible with a new version of an operating system. Therefore, consumers may be required to purchase new versions of application programs, which may be an expensive proposition. In large organizations, this can result in significant costs in upgrading independent software vendor (ISV) software, significant delays and expenditure associated with migrating application software and its accompanying data, and an increase in cost of the overall project.

Therefore, there is a need in the art for systems and methods for determining compatibility between application programs and operating systems. More particularly, it would be desirable to provide a tool that can give end users an assessment of the risks of incompatibility between software currently operating on their computer systems and a new or upgraded operating system.

SUMMARY OF THE INVENTION

The present invention addresses these and other issues by providing systems and methods for assessing the risk of binary compatibility failure between software modules, or binary files thereof, and an application binary interface. In one aspect, computer system operators may use the systems and methods to assess the risk of binary compatibility failure between their software application binaries on their computer systems and an application binary interface.

In an exemplary embodiment, the invention provides a computer-based method for assessing the risk of binary compatibility failure between a first binary file and a first software module. An exemplary method comprises receiving a listing of symbols and libraries used in the first binary file, processing the listing of symbols and libraries used in the first binary file, and generating a record indicating the risk of binary compatibility failure between the first binary file and the first software module.

In another embodiment, the invention provides a computer-based method for assessing the risk of binary compatibility failure between a first binary file and an ABI. The method comprises receiving a file, the file comprising a binary file identifier, the results of a binary compatibility test between the binary file and the ABI, and a list of Unix symbols and libraries invoked by the binary file, generating an undetermined record if the results of the binary compatibility test were indeterminate, generating a failure record if the binary file invokes symbols that are not supported by the ABI, generating a failure record if the binary file invokes symbols that belong to a EOL library, generating a failure record if the binary file invokes a library that has either known problems or private symbols that have been demoted, generating a high risk record if the binary file invokes a library that has one or more changed behaviors, generating a low risk record if the binary file performs static linking to system libraries that have not changed, or that has private symbols that have not changed, generating a guarantee eligible record if the binary file passed all tests for binary compatibility, and storing the generated records in a computer readable medium.

In another embodiment, the invention provides a computer program product for use in connection with a processor for assessing the risk of binary compatibility failure between a first binary file and a first software module. The computer program product comprises logic instructions, executable on a processor, for receiving a listing of symbols and libraries used in the first binary file; logic instructions, executable on a processor, for processing the listing of symbols and libraries used in the first binary file; and logic instructions, executable on a processor, for generating a record indicating the risk of binary compatibility failure between the first binary file and the first software module.

BRIEF DESCRIPTION OF THE DRAWINGS

The foregoing and other features, utilities and advantages of the invention will be apparent from the following more particular description of a preferred embodiment of the invention as illustrated in the accompanying drawings.

DETAILED DESCRIPTION

Figure 1:
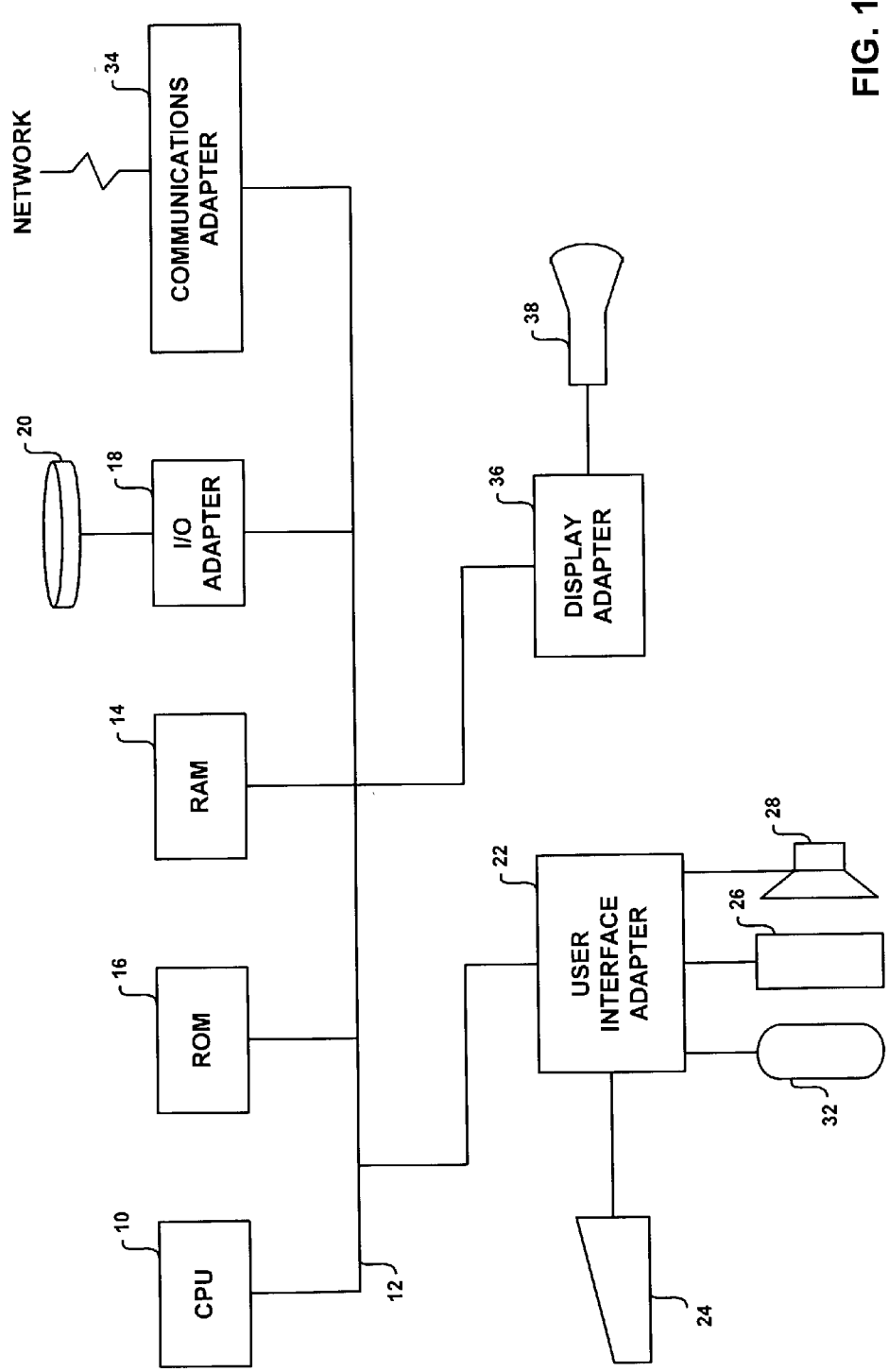
FIG. 1 is a schematic illustration of an exemplary hardware system in which the present invention may be implemented.

Aspects of the present invention will be described with reference to assessing binary compatibility between software installed on a computer system and the Sun Solaris™ operating system, or more particularly between binary files and the Sun Solaris™ Application Binary Interface (ABI). It will be appreciated, however, that the present invention is not so limited.

The term binary compatibility refers to maintaining compatibility between a binary (i.e., compiled) version of a first software module, e.g., an application module, and a second software module, e.g., an operating system. The Solaris™ operating system complies with an ABI, which is a set of supported run-time interfaces available for an application to use. Among other things, the Solaris™ ABI defines the interfaces provided by the system libraries, the interfaces provided by the kernel system calls, the locations and formats of various system files and directories, and the input and output syntax and semantics of system utilities. An application that is binary compatible with the ABI of a particular version of an operating system should be compatible with any other version of the operating system that maintains the same ABI.

The Solaris™ ABI changes infrequently, and only with significant advance notice. Therefore, the Solaris™ ABI is a useful tool for developers to ensure that applications being developed rely on interfaces that are stable, such that they will run on subsequent releases of the operating system. In addition, the ABI is a useful tool for end users to evaluate whether application software is ABI compatible, and therefore will work on the operating system. Information about the Solaris™ ABI is available at http://www.sun.com.

To aid users and developers in building stable Solaris applications, Sun has produced two tools that determine whether an application is using the correct (i.e., public) Solaris interfaces, and that it is using them correctly. The first tool, appcert, is a PERL script that statically examines ELF (Executable and Linking Format) binaries (i.e., executables and shared objects) to see what Solaris library interfaces they use. Appcert compares the list of interfaces used against the definition of which interfaces in each Solaris library are public and private. The appcert utility then produces summary and detailed reports of any potential binary stability problems detected.

The appcert utility may be executed by simply providing it with the name of one or more binary files to check. Appcert first ensures that the file is suitable for checking (e.g., that the file has execution permissions set and is not suid root). Then, appcert uses the debugging mode to collect the binary's symbols, which may be checked against the definition of public and private symbols for that library in that release of Solaris. In addition, appcert checks executables for static linking of libraries. If an executable is completely statically linked, then appcert generates a report indicating this fact. Appcert can also detect partial static linking using heuristic techniques.

It should be noted that the appcert utility flags potential binary stability problems. Most private interfaces remain unchanged in any given update of Solaris. However, they may change at any time.

The second tool, apptrace, is a C program that dynamically traces calls to Solaris library routines as an application runs. Apptrace takes advantage of link-auditing functionality introduced in the Solaris 2.6 run-time linker to dynamically trace calls to Solaris library routines as the application runs. This permits a developer to examine an application's use of the Solaris system interfaces. The ABI tools allow easy and rapid identification of which binaries may have binary compatibility with a given release of Solaris.

An exemplary embodiment of a system for determining compatibility between stand-alone application software and an operating system may be practiced in the context of a computer such as Sun™ Sparcstation™, a UNIX-based workstation, or a personal computer such as IBM PS/2, Apple Macintosh computer. A representative hardware environment is depicted in FIG. 1, which illustrates a typical hardware configuration of a workstation in accordance with a preferred embodiment having a central processing unit 10, such as a microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as Sun Microsystems' Solaris™ or another UNIX-based operating system, or another operating system such as the Microsoft Windows Operating System (OS), the IBM OS/2 operating system, or the Apple Computer MACOS. Those skilled in the art will appreciate that a system in accordance with the present invention may also be implemented on platforms and operating systems other than those mentioned.

An exemplary system for assessing the risk of binary compatibility failure between a first binary file and an operating system may be implemented as a software process (or set of processes) executable on a processor. In practice, a computer system operator may download utilities from http://www.sun.com to determine whether the software application(s) they are developing comply with the Solaris public interfaces and the Solaris ABI. The utilities may include the appcert utility discussed above. Among other things, the appcert utility checks the binary code to determine whether: (1) private or demoted symbols are invoked by the application; (2) Solaris libraries are statically linked; (3) demoted libraries are invoked by the application; (4) all symbols invoked by the application are identified to belong to a known shareable image, and (5) other compatibility issues are raised (e.g., no symbols currently available but not supported in the future are invoked).

Figure 2:
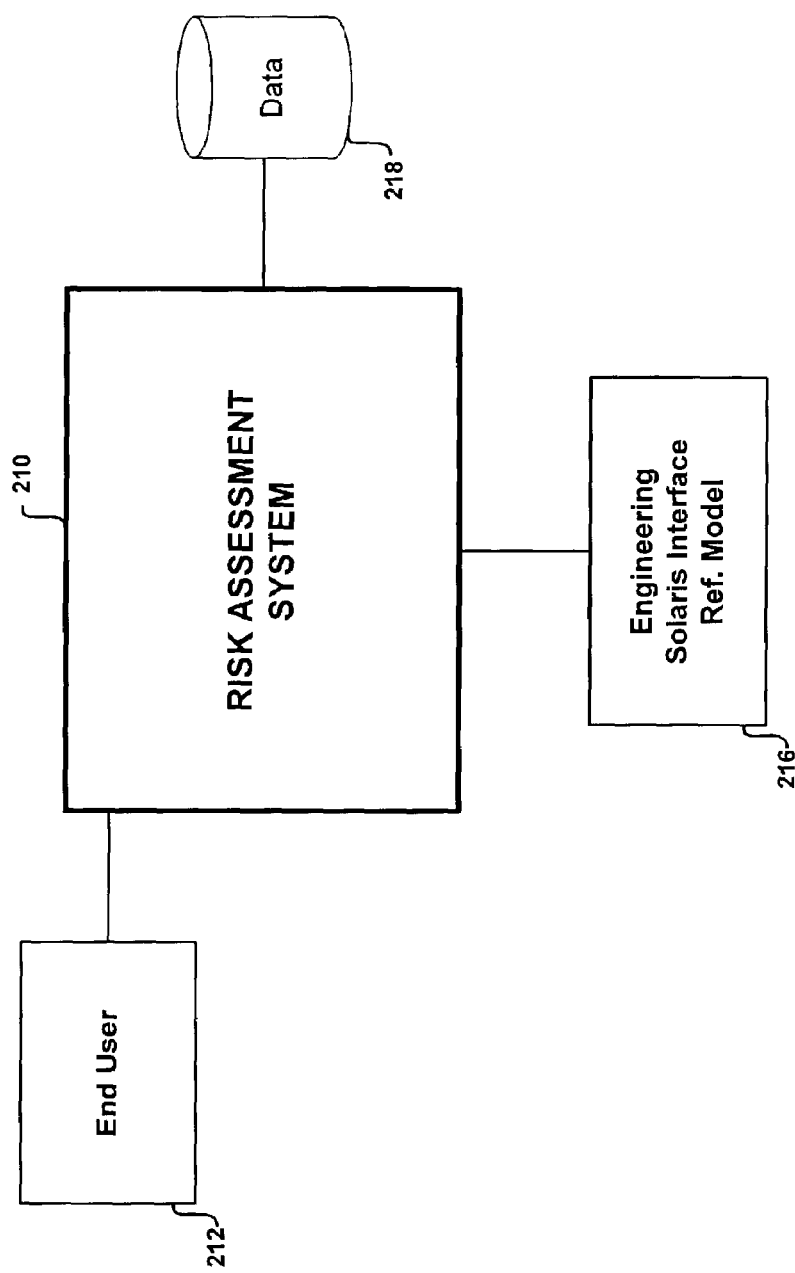
FIG. 2 is a schematic diagram illustrating a representative risk analysis system and inputs to the system.

FIG. 2 is a schematic depiction of a risk assessment system. Risk assessment system 210 may receive inputs from an engineering module 216. In an exemplary embodiment, the engineering module provides a Solaris Interface Reference Model that contains the list of public and private symbols bound to the shareable libraries provided with Solaris and possibly in the future with Sun layer products. The Solaris Interface reference model may cover a standard set of runtime interfaces that constitute the ABI and may also include optional Sun packages that may be selected by users during installation. The engineering module may maintain a cross-reference table to identify the symbols, the libraries, the packages and the cluster package. This cross-reference table may be used by the utilities in the risk assessment system 210.

In practice, an end user 212 may access the risk assessment system 210 over a suitable communication link, e.g., the internet, and download the utilities in the risk assessment system 210. The end user may then execute the appcert utility to examine the binary files on its computer systems. The results of the appcert utility may be transmitted back to the risk assessment system 210 over a suitable communication link, processed, and stored in a database 218. This process is explained in greater detail below.

Figure 3:
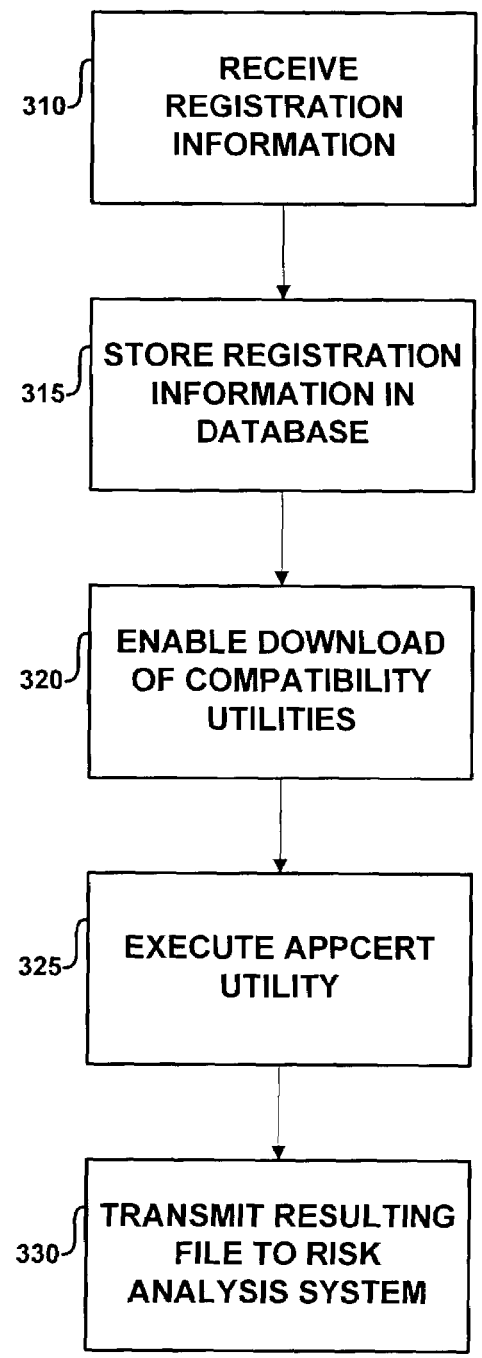
FIG. 3 is a flowchart illustrating steps of a process for assessing the risk of binary compatibility failure.
Figure 4A:
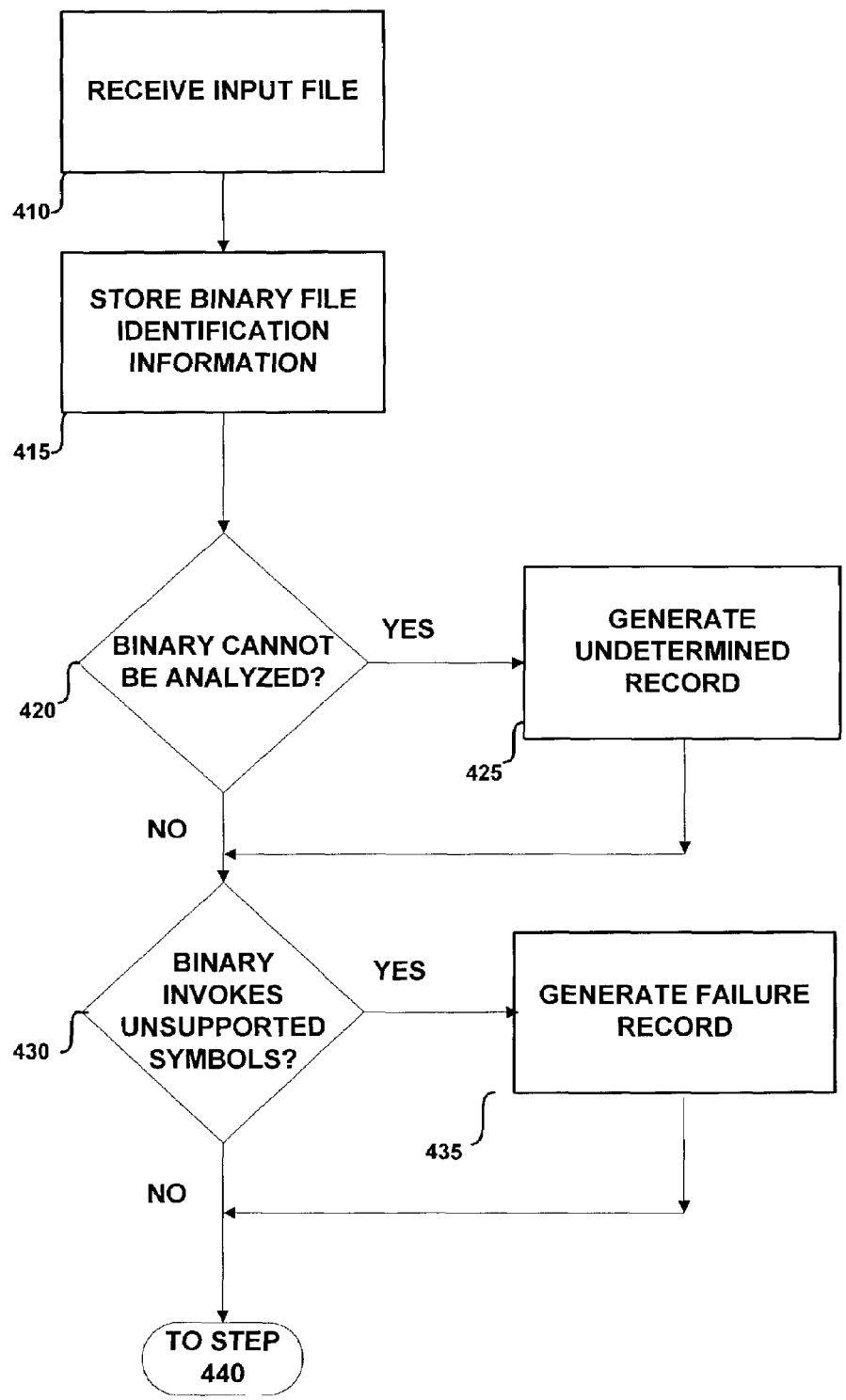
FIGS. 4A–4B are a flowchart illustrating steps of a process for assessing the risk of binary compatibility failure.
Figure 4B:
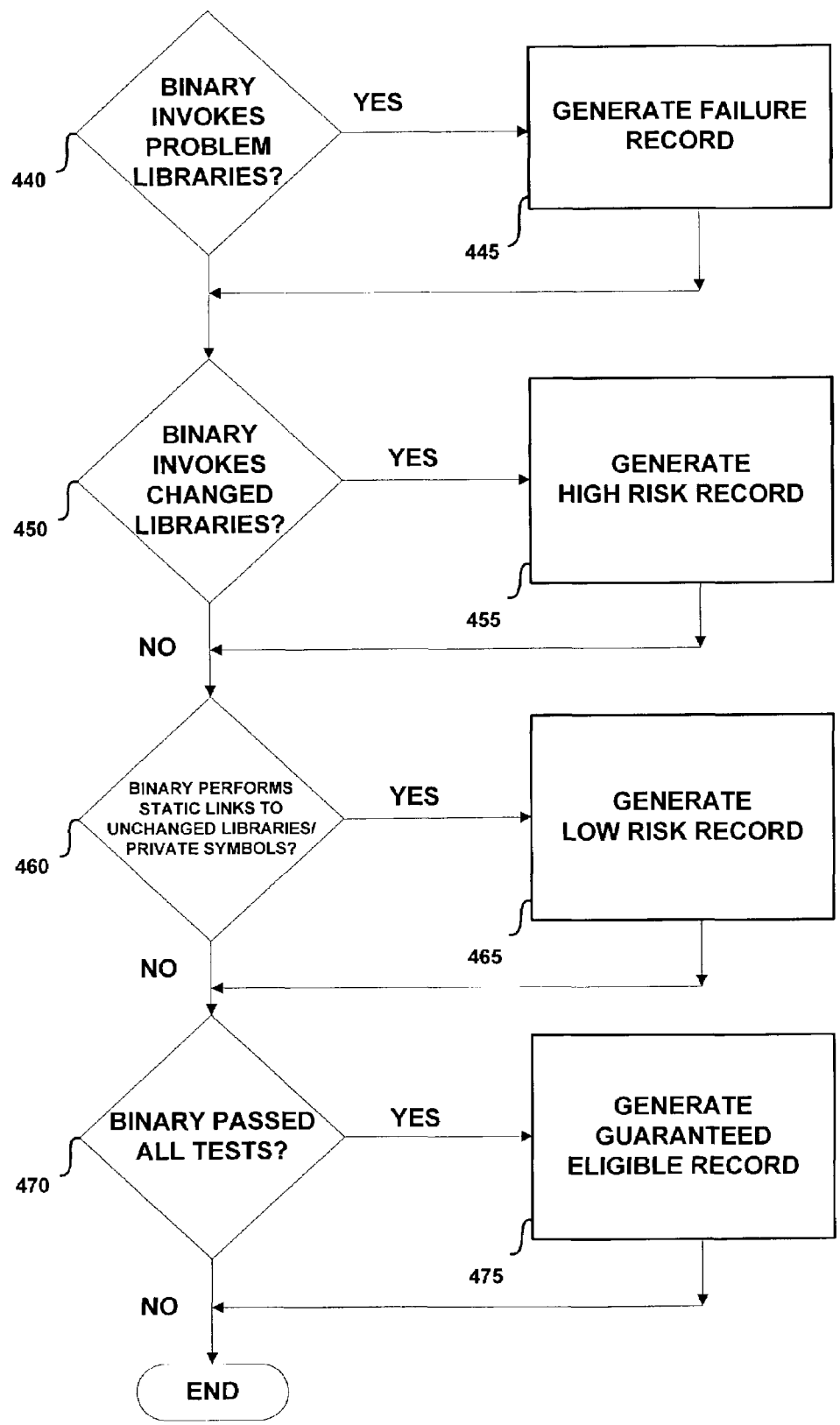

FIGS. 3–4B are flowcharts illustrating methods of determining assessing a risk of binary compatibility failure between stand-alone application software and an operating system. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

An end user who wants to certify an application may first register with the risk assessment system 210. The registration process may be implemented over the internet (or other suitable communication medium). In an exemplary embodiment, registration may be accomplished by accessing http://www.sun.com. At step 310, the certification test suite receives registration information from the end user. The registration information may include, e.g., the company name, including the name of a parent company, if applicable, the address, contact information for the company, and a password associated with the company. This information may be stored (step 315) in a suitable computer readable medium, e.g., a database 218.

After the end user has registered, one or more of the utilities that constitute the risk assessment system may be made available for downloading (step 320) to the subscriber over the internet (or another suitable communication medium). The end user may then use the utilities to generate a file that includes: (1) the name of the binary file(s) that have been evaluated, (2) a unique identifier associated with each binary file being evaluated (e.g., the MD5 signature), (3) the output of the appcert utility for each binary file evaluated. This file may be transmitted to the risk assessment system 210 (step 330).

FIGS. 4A–4B are a flowchart illustrating the steps performed by the risk assessment system 210 in analyzing received files to assess the risk of binary compatibility failure. Rather than presenting a simple pass or fail output, risk assessment system 210 assigns a risk level to the application based on the outcome of the tests administered by the appcert application. In one embodiment, when the risk assessment system 210 receives an input file (step 410), the risk assessment system 210 may store (step 415) identification information for each binary file in the input file in a computer readable medium, e.g., a database 218.

At step 420, risk assessment system 210 examines the output of the appcert application to determine whether appcert was incapable of analyzing the binary file. The appcert utility is incapable of analyzing binaries that were written in certain programming languages, which don't follow the rules of the software module, e.g., C++, and the Solaris ABI rules. If appcert was incapable of analyzing the file, then a record is generated indicating that the binary compatibility analysis is indeterminate (step 425), and control can pass to the next test. Alternatively, the process can examine the results of the next binary file in the received file, if there is another binary file.

At step 430, risk assessment system 210 examines the output of the appcert application to determine whether the binary file invokes any unsupported symbols. In an exemplary embodiment, risk assessment system maintains a database (or table) of symbols accompanied by information indicating the current status of the symbol. The appcert results, which include symbols invoked in the binary files analyzed by appcert, may be compared to the symbols in the tables. If the binary file invokes a symbol that is no longer supported, then a record is generated indicating that the binary file has failed a binary compatibility test (step 435).

At step 440, risk assessment system 210 examines the output of the appcert application to determine whether the binary file invokes any libraries that have a known problem (e.g., obsolete libraries or demoted symbols). In an exemplary embodiment, risk assessment system 210 maintains a database (or table) of libraries with known problems. The appcert results, which include libraries invoked in the binary files analyzed by appcert, may be compared to the libraries in the tables. If the binary file invokes a library that has a known problem, then a record is generated indicating that the binary file has failed the binary compatibility test (step 445).

At step 450, risk assessment system 210 examines the output of the appcert application to determine whether the binary file invokes any libraries that have known behavioral changes. In an exemplary embodiment, risk assessment system 210 maintains a database (or table) of libraries with known behavioral changes. The appcert results, which include libraries invoked in the binary files analyzed by appcert, may be compared to the libraries in the tables. If the binary file invokes a library that has a known behavioral change, then a record is generated indicating that the binary file presents a high risk of failing a binary compatibility test (step 455).

At step 460, risk assessment system 210 examines the output of the appcert application to determine whether the binary file performs any static links to unchanged system libraries or has a private symbol that has not changed. If the binary performs any such links or uses an unchanged private symbol, then a record is generated indicating that the binary file presents a low risk of failing a binary compatibility test (step 465).

At step 470, risk assessment system 210 determines whether the binary passed all the tests for compatibility. In one embodiment, risk assessment system tracks the answers to tests 420, 430, 440, 450, and 460. If the "no" path is followed for each of these tests, then the binary file in question is highly likely to be binary compatible with the ABI against which it was tested. Accordingly at step 475 the system generates a guarantee eligible record, which may be stored in a computer readable medium, e.g., database 218.

The process defined by steps 420–475 may be repeated for each binary file received in the input file to generate a series of records indicating the likelihood that each binary file on the end-user's computer system will suffer a binary compatibility failure with the ABI it was tested against. It will be appreciated that the binary file may be tested against multiple ABIs. This information may be formatted as a report and transmitted to the end user over a suitable communication link, e.g., the internet. This enables end users to better gauge whether upgrading their Solaris operating environment may create binary compatibility issues with existing application software.

While the invention has been particularly shown and described with reference to a preferred embodiment thereof, it will be understood by those skilled in the art that various other changes in the form and details may be made without departing from the spirit and scope of the invention.

What is claimed is:

1. A computer-based method for assessing the risk of binary compatibility failure between a first binary file and a first software module, comprising:
    receiving a listing of symbols and libraries used in the first binary file;
    processing the listing of symbols and libraries used in the first binary file, wherein the processing comprises comparing the received listing of symbols and libraries with a list of symbols supported by the first software module; and
    generating a record indicating the risk of binary compatibility failure between the first binary file and the first software module based on results of the processing of the listing of symbols and libraries.

2. The method of claim 1, wherein the step of receiving a list of symbols and libraries comprises establishing a communication link with a computer workstation on which the first binary file executes.

3. The method of claim 1, wherein the step of processing the listing of symbols and libraries includes comparing a received list of libraries in the listing of symbols and libraries to a list of libraries in a database defining libraries supported by the first software module.

4. The method of claim 1, wherein if the first binary file uses symbols that are not supported by the first software module, then generating a record indicating that the first binary file fails a test for binary compatibility with the first software module.

5. The method of claim 1, wherein if the first binary file uses libraries that are not supported by the first software module, Then generating a record indicating that the first binary file fails a test for binary compatibility with the first software module.

6. The method of claim 1, wherein if the first binary file uses libraries that have known behavioral changes, then generating a record indicating that the first binary file presents a high risk of failure for binary compatibility with the first software module.

7. The method of claim 1, wherein if the first binary statically links to an unchanged library or contains unchanged private symbols, then generating a record indicating that the first binary file presents a low risk of failure for binary compatibility with the first software module.

8. The method of claim 1, wherein if the first binary file cannot be analyzed, then generating a record indicating that the risk of binary compatibility failure cannot be determined.

9. The method of claim 1, further comprising storing the record in a computer readable medium with an identifier that uniquely identifies the first binary file.

10. The method of claim 1, wherein the first software module comprises an operating system and the first binary file comprises a compiled version of an application module.

11. A computer-based method for assessing the risk of binary compatibility failure between a first binary file and an operating system interface, comprising:
    receiving a file, the file comprising a binary file identifier, the results of a binary compatibility test between the binary file and the operating system interface, and a list of Unix symbols and libraries invoked by the binary file;
    generating an undetermined record if the results of the binary compatibility test were indeterminate;
    generating a failure record if the binary file invokes symbols that are not supported by the operating system interface;
    generating a failure record if the binary file either invokes a library that has known problems or private symbols that have been demoted;
    generating a high risk record if the binary file invokes a library that has one or more changed behaviors;
    generating a low risk record if the binary file performs static linking to unchanged system libraries or contains unchanged private symbols;
    generating a guarantee eligible record if the binary file passed all tests for binary compatibility; and
    storing the generated records in a computer readable medium.

12. The method of claim 11, further comprising transmitting the stored records to a remote location.

13. A computer program product for use in connection with a processor for assessing the risk of binary compatibility failure between a first binary file and a first software module, comprising:
    logic instructions, executable on a processor, for receiving a listing of symbols and libraries used in the first binary file;
    logic instructions, executable on a processor, for processing the listing of symbols and libraries used in the first binary file, wherein the processing comprises comparing the received listing of symbols and libraries with a list of symbols supported by the first software module; and
    logic instructions, executable on a processor, for generating a record indicating the risk of binary compatibility failure between the first binary file and the first software module based on results of the Processing of the listing of symbols and libraries.

14. The computer program product of claim 13, wherein the logic instructions for receiving a list of symbols and libraries comprises establishing a communication link with a computer workstation on which the first binary file execute.

15. The computer program product of claim 13, wherein the logic instructions for processing the listing of symbols and libraries includes comparing received list of libraries in the listing of symbols and libraries to a list of libraries in a database defining libraries supported btthe first software module.

16. The computer program product of claim 13, further comprising logic instructions for generating a record indicating that the first binary file fails a test for binary compatibility with the first software module if the first binary file uses symbols that are not supported by the first software module.

17. The computer program product of claim 13, further comprising logic instructions for generating a record indicating that the first binary file fails a test for binary compatibility with the first software module if the first binary file uses libraries that are not supported by the first software module, or uses symbols which have been demoted and thus are not compatible with the first software module.

18. The computer program product of claim 13, further comprising logic instructions for generating a record indicating that the first binary file presents a high risk of failure for binary compatibility with the first software module if the first binary file uses libraries that have known behavioral changes.

19. The computer program product of claim 13, further comprising logic instructions for generating a record indicating that the first binary file presents a low risk of failure for binary compatibility with the first software module if the first binary statically links to links to an unchanged system library or contains unchanged private symbols.

20. The computer program product of claim 13, further comprising logic instructions for generating a record indicating that the risk of binary compatibility failure cannot be determined if the first binary file cannot be analyzed.

21. The computer program product of claim 13, further comprising logic instructions for storing the record in a computer readable medium with an identifier that uniquely identifies the first binary file.

\* \* \* \* \*

UNITED STATES PATENT AND TRADEMARK OFFICE
CERTIFICATE OF CORRECTION

| | | |
|---|---|---|
| PATENT NO. | : 7,069,474 B2 | Page 1 of 1 |
| APPLICATION NO. | : 10/246075 | |
| DATED | : June 27, 2006 | |
| INVENTOR(S) | : Dario Atallah and Clement Ng | |

It is certified that error appears in the above-identified patent and that said Letters Patent is hereby corrected as shown below:

Column 7, line 53, "Then" should be --then--

Column 7, line 60, "execute" should be --executes--

Column 7, line 65, "btthe" should be --by the--

Column 8, line 54, "Processing" should be --processing--

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,069,474 B2 |
| APPLICATION NO. | : 10/246075 |
| DATED | : June 27, 2006 |
| INVENTOR(S) | : Dario Atallah and Clement Ng |

It is certified that error appears in the above-identified patent and that said Letters Patent is hereby corrected as shown below:

Column 8, line 60, "execute" should be --executes--

Column 8, line 65, "btthe" should be --by the--

Signed and Sealed this

Sixth Day of March, 2007

JON W. DUDAS
*Director of the United States Patent and Trademark Office*